United States Patent [19]

Adzima et al.

[11] Patent Number: 4,473,618

[45] Date of Patent: Sep. 25, 1984

[54] CHROME-FREE SIZING COMPOSITION CONTAINING TITANIUM ACETYL ACETONATE FOR GLASS FIBER GUN ROVING

[75] Inventors: Leonard J. Adzima, Pickerington, Ohio; Jeffrey L. Antle, Jackson, Tenn.; David E. Musick, Newark; Fred G. Krautz, Toledo, both of Ohio

[73] Assignee: Owens-Corning Fiberglas Corporation, Toledo, Ohio

[21] Appl. No.: 494,204

[22] Filed: May 13, 1983

[51] Int. Cl.$^3$ ............................................. C08K 3/40
[52] U.S. Cl. ................................. 428/378; 428/388; 428/389; 428/391; 428/394; 523/200; 523/206; 523/217; 523/501; 523/503; 523/504
[58] Field of Search ............... 428/378, 389, 391, 388, 428/392, 394, 241; 523/501, 502, 503, 504, 206, 200, 217; 524/284, 254

[56] References Cited

U.S. PATENT DOCUMENTS

| | | | |
|---|---|---|---|
| 3,754,971 | 8/1973 | Pepe et al. | 523/217 |
| 3,802,953 | 4/1974 | Marzocchi | 523/217 |
| 3,933,711 | 1/1976 | Motsinger et al. | 428/241 |
| 3,968,068 | 7/1976 | Haggerty | 428/392 |
| 4,126,729 | 11/1978 | Richardson et al. | 428/391 |
| 4,178,412 | 12/1979 | Sage et al. | 428/392 |
| 4,233,809 | 11/1980 | Graham | 428/391 |
| 4,244,844 | 1/1981 | Molinier et al. | 428/391 |
| 4,291,136 | 9/1981 | Keogh | 428/391 |
| 4,338,233 | 7/1982 | Das et al. | 428/391 |
| 4,341,877 | 7/1982 | Das et al. | 428/391 |

*Primary Examiner*—John C. Bleutge
*Assistant Examiner*—Herbert J. Lilling
*Attorney, Agent, or Firm*—Ronald C. Hudgens; Greg Dziegielewski; James B. Wilkens

[57] ABSTRACT

Chrome-free aqueous sizing composition for glass fiber gun roving contains a mixture of emulsified film-forming polymers, titanium acetyl acetonate, silylated polyazamide, cationic lubricant and methacryloxypropylsilane.

14 Claims, No Drawings

CHROME-FREE SIZING COMPOSITION CONTAINING TITANIUM ACETYL ACETONATE FOR GLASS FIBER GUN ROVING

FIELD OF THE INVENTION

This invention relates to the field of sizing compositions for glass fibers, and more particularly, for glass fiber gun roving, and to glass fibers coated therewith.

BACKGROUND OF THE INVENTION

Glass fibers used as reinforcing elements in polymeric or resinous matrix materials are usually coated with a very light-weight size coating which serves to protect the fibers from damage by abrasion during processing, handling and/or use, to bind the individual fibers into more-or-less tightly integrated multi-fiber bundles or strands, and/or to enhance the reinforcing interaction between the fibers and the resinous matrix in which they are imbedded as reinforcing elements. Such sizing compositions are frequently applied to the glass fibers at the time of their initial production, which is ordinarily by pulling a plurality of streams of molten glass issuing from a reservoir thereof through a substantially corresponding plurality of suitable orifices so as to attenuate these streams to the desired fiber diameter as they cool and solidify. The sizing composition is typically applied to the individual fibers in-line as soon as they have cooled sufficiently below the solidification temperature, which cooling may be accelerated by wetting the newly solidified but still hot fibers with water. Liquid sizing compositions are applied in such situations by spraying, by drawing the fibers across a suitable roll, belt, apron, pad, etc. wet with the liquid sizing composition, or other conventional liquid coating methods. After the liquid sizing composition has been applied to the individual advancing glass fibers, they are typically brought together while still at least partially wet with the liquid sizing composition into one or more multifiber bundles or strands, which may be collected into a suitable package for further processing, storage and/or shipment, as by winding onto a rotating collet. The wet fibers or strands are normally dried, before and/or after such collection, to deposit the non-volatile residue of the liquid sizing composition onto the surfaces of the fibers.

Liquid sizing compositions suitable for such application to glass fibers ordinarily are dilute solutions, dispersions and/or emulsions, often in aqueous media, of a film-forming polymer or resin, a lubricant and a coupling agent. Other components, such as anti-static agents (especially where the sized glass fibers are to be chopped into short lengths while dry), emulsifying or solubilizing agents, viscosity modifying agents, etc. have also sometimes been incorporated in such liquid sizing compositions.

One of the uses for glass fibers is as gun roving, which desirably consists of a plurality of continuous strands weakly integrated together, with each strand consisting of a plurality of individual glass fibers tightly integrated together by the size coating on the fibers. Such gun roving is used by feeding it through a suitable chopper incorporated in or closely associated with a suitable gun for spraying a fluid resin composition together with the chopped roving onto a mold or other suitable target so that the chopped roving or pieces of strand separated therefrom becomes imbedded in the fluid resin, which will subsequently be solidified by cooling and/or by curing by chemical reaction. Representative equipment and corresponding methods for such use of glass fibers in gun roving are described in U.S. Pat. No. 3,111,440, entitled DEVICES AND METHODS FOR APPLYING STRANDS, issued Nov. 19, 1963 for an invention of William H. Prentice, incorporated herein by reference. Typically, the chopped pieces are from about ½ to about 2 inches in length.

Glass fiber gun roving has heretofore been coated with liquid sizing compositions containing Werner-type chrome complexes, such as methacrylato chromic chloride, which is thought to function in part at least as a glass-resin coupling agent, although such chrome complexes have sometimes been used together with conventional organosilane glass-resin coupling agents. Before the present invention it had not been thought possible to achieve a satisfactory balance of desirable properties in glass fiber gun roving without the inclusion of a chrome complex in the sizing composition for the constituent fibers thereof, and particularly to achieve a desirable ease and completeness of chopping in conventional equipment, while also achieving desirably rapid and complete wetting of the chopped reinforcement by the liquid matrix resin composition and providing a desirable enhancement of the physical properties of the resinous matrix while holding the generation of fuzz, from breakage of fibers during processing of the continuous strand or roving, and "fly", i.e., static-dispersed pieces of chopped roving strand or partially or fully fibrillated residues thereof accompanying the chopping and spraying at the gun, to desirably low incidence.

SUMMARY OF THE INVENTION

A substantially chrome-free aqueous sizing composition for glass fiber gun roving which comprises (A) a mixture of emulsified film-forming polymers comprising a polymer of vinyl acetate and ethylene, a polymer of vinyl acetate and an epoxy-functional vinyl monomer, and an unsaturated polyester resin; (B) titanium acetyl acetonate; (C) a silylated polyaminopolyamide hydrochloride or hydrolysate thereof; (D) a cationic lubricant; and (E) 3-methacryloxypropyltrimethoxysilane or hydrolysate thereof.

DESCRIPTION OF PREFERRED EMBODIMENTS

The emulsified film-forming polymer components of the present invention can be any emulsified polymers of the types called for which will coalesce to form coherent films, and which preferably will so coalesce at normal ambient workplace temperatures. A small amount of suitable plasticizer to aid in such coalescence, of which many are known and available, may be blended and co-emulsified with one or more of the polymers, if desired, but it is ordinarily found possible and preferable to select polymers which do not require such additives to exhibit advantageous characteristics in use. However, it is nonetheless desirable and preferred to include a latently reactive unsaturated plasticizer with the unsaturated polyester resin to ultimately react with this unsaturated polyester and with an unsaturated polyester matrix resin to more intimately bond the glass fibers to each other and to the matrix in which they are imbedded as reinforcing elements.

A particularly suitable emulsified polymer of vinyl acetate and ethylene is available as Airflex 410 (TM/Air Products and Chemicals Co.), an aqueous emulsion containing about 55% by weight non-volatiles comprising a vinyl acetate-ethylene copolymer having a glass transition temperature of about 2° C. non-ionically emulsified as particles of about 0.3 μm average diameter.

A particularly suitable emulsified polymer of vinyl acetate and an epoxy-functional vinyl monomer is available as Resyn 25-1971 (TM/National Starch and Chemical Corp.), an aqueous emulsion containing about 54.5±1% by weight non-volatiles comprising a copolymer of vinyl acetate with about 2% by weight of glycidyl methacrylate non-ionically emulsified.

A particularly suitable unsaturated polyester resin is available as MR70D (TM/United States Steel Corp.), an approximately 60:40 by weight blend of an unsaturated polyester and diallyl phthalate, a latently reactive plasticizer, which was non-ionically emulsified to form an aqueous emulsion containing about 59% by weight non-volatiles and designated PE-700.

A particularly suitable titanium acetylacetonate is available as Tyzor AA (TM/E.I. duPont de Nemours, Inc.), a 75% by weight solution or dispersion of bis(2, 4-pentanedionate-0,0')bis(2-propanolato) titanium in isopropanol.

A particularly suitable silylated polyamino polyamide hydrochloride is available as Y-9567 (TM/Union Carbide Corp.), an 80% by weight dispersion or solution in methanol of a hydrochloric acid salt of

CH$_3$[NHCH$_2$CH$_2$N(CH$_3$)CH$_2$CH$_2$C(=O)]$_x$

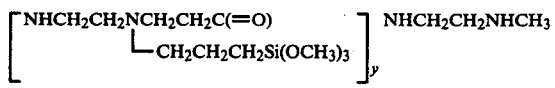

$$\left[ \begin{array}{c} \text{NHCH}_2\text{CH}_2\text{NCH}_2\text{CH}_2\text{C}(=\text{O}) \\ \phantom{xxx}\text{CH}_2\text{CH}_2\text{CH}_2\text{Si}(\text{OCH}_3)_3 \end{array} \right]_y \text{NHCH}_2\text{CH}_2\text{NHCH}_3$$

where x+y is a number from about 3 to about 10. Such materials and their preparation are described in detail in U.S. Pat. No. 3,746,738, entitled SILICON CONTAINING POLYAZIMIDES issued July 17, 1973 for an invention of Enrico J. Pepe and James G. Marsden, incorporated herein by reference.

A particularly suitable cationic lubricant is a weak acid salt of a partial fatty amide of a polyamine such as Emery 6760 U (TM/Emery Industries, Inc.), a 65% by weight aqeuous solution or dispersion of an acetic acid salt of a partial amide of mixed fatty acids having about 6 to 8 carbon atoms with a polyethylenamine. The same material has also been available undiluted as Emery 6717.

A particularly suitable 3-methacryloxypropyltrimethoxysilane is available in a blend with a proprietary stabilizer as A-174 (TM/Union Carbide Corp.) The silane is preferably hydrolyzed in dilute aqueous weak acid before use.

While the proportions of the various components of the aqeuous sizing compositions of the invention are not narrowly critical, it is preferred that they be within about the following ranges:

| Component | Preferred Weight % |
|---|---|
| Emulsified polymer of vinyl acetate and ethylene | 1–5 |
| Emulsified polymer of vinyl acetate and an epoxy-functional vinyl monomer | 1–5 |
| Emulsified unsaturated polyester resin | 0.5–1.5 |
| Titanium acetyl acetonate | 0.5–1.5 |
| Silylated polyaminopolyamide | 0.01–0.2 |
| hydrochloride | |
| Cationic lubricant | 0.005–0.1 |
| 3-methacryloxypropyltrimethoxy silane | 0.005–0.1 |

Other components can be included, if desired, but in order to ensure that the advantages of the invention are realized, it is preferred that other components be omitted unless it is found that no significant diminution of those advantages results from the inclusion thereof. In particular, since it is a principal object of the invention to provide a chrome-free sizing composition for glass fiber gun roving, no chromium compounds or complexes should be included in sizing compositions of the invention. However, since some of the components, e.g. the titanium acetyl acetonate, the silylated polyaminopolyamide, and the cationic lubricant, are solubilized by acids and/or lower alcohols, the inclusion of minor additional amounts of alcohols such as methanol, ethanol, propanol, isopropanol, etc. and/or acids such as hydrochloric or acetic may be found desirable.

The aqueous sizing compositions of the invention can be prepared following generally accepted mixing practices. These sizing compositions can be applied to the glass fibers using any convenient method. The amount of aqueous sizing composition applied is not narrowly critical, but is preferably controlled so as to deposit on the glass fibers a size coating comprising the in situ dried residue of the aqueous sizing composition of the invention in an amount from about 0.5 to about 2 percent of the weight of the glass, taking into account the dilution of the non-volatile components in the aqueous sizing composition and the usual mechanical loss of some of the aqueous composition initially applied to the fibers before it is dried thereon.

Preferably, the aqueous sizing composition is applied to the glass fibers as they are produced by continuous drawing from the melt. While the aqueous sizing composition on the fibers may be at least partially dried before collection into a package, it is entirely satisfactory to gather the wet fibers into strands, preferably with about 100 to about 300 and more preferably about 200 individual fibers to each strand, collecting these strands into packages as by winding on a collet, which also provides the tension for drawing the fibers, and then heating the package in a conventional circulating hot air oven to drive off volatile materials and deposit the non-volatile components of the sizing composition as a size coating on the fibers which will also bind together the individual fibers into a tightly integrated strand.

The integrated continuous glass fiber strands can be roved together in weakly integrated roving, preferably of about 30 to about 70 strands each, to produce a continuous glass fiber gun roving. While the diameter of the individual glass fibers is not narrowly critical, diameters from about 10 μm to about 13 μm are preferred.

EXAMPLE 1

Particularly advantageous chrome-free aqueous sizing compositions for glass fiber gun roving, representative of the present invention, were prepared according to the following formulations:

| Component | Weight % | | | |
|---|---|---|---|---|
| | A | | B | |
| | As rec'd | Active | As rec'd | Active |
| Airflex 410 (55%) | 5.10 | 2.80 | 5.10 | 2.80 |
| Resyn 25-1971 (54.5%) | 4.45 | 2.43 | 4.45 | 2.43 |
| PE-700 (59%) | 1.25 | 0.74 | 1.25 | 0.74 |
| Tyzor AA (75%) | 1.10 | 0.82 | 1.10 | 0.82 |
| Y-9567 (80%) | 0.03 | 0.024 | 0.10 | 0.08 |
| Emery 6760U (65%) | 0.03 | 0.02 | 0.03 | 0.02 |
| A-174 | 0.015 | 0.015 | 0.015 | 0.015 |
| Isoproponol | 2.00 | — | 2.00 | — |
| Acetic acid | 0.005 | 0.005 | 0.005 | 0.005 |
| D.I. water | Balance | | Balance | |

Both A and B formulations had non-volatile content 6.0±0.5 percent by weight and pH of about 3.8 to 4.9.

These compositions were applied to both H-fibers (about 10.1 to about 11.4 μm in diameter) and J-fibers (about 11.4 to about 12.7 μm diameter) with a conventional applicator as they were drawn from the melt, the wet fibers gathered into strands of about 200 individual fibers and wound into packages on a rotating collet in groups of 4 strands. The packages were dried in a conventional circulating hot air oven maintained at about 265° F. for about 12-14 hours, depending on the size of the package. The dried size coating thus deposited on the glass fibers constituted about 1.0 to about 1.3 percent of the weight of the glass and tightly integrated the strands. The strands from 13 packages of each type of H-fibers and 11 packages of each type of J-fibers were roved separately into weakly integrated gun roving by conventional means.

The glass fiber gun rovings so produced were found to exhibit exceptionally advantageous combinations of properties, particularly in view of the sizing compositions being chrome-free. Thus, they were found to chop easily and cleanly, to produce advantageously low levels of fuzz and fly, to wet out rapidly and fully with conventional unsaturated polyester matrix resins (the H-fiber roving being especially useful with unfilled matrix resin systems and the J-fiber roving with more viscous filled matrix resin systems, both of which can be chemically thickened, if desired). The dried strands unwound freely from the packages during roving with little or no disintegration of the strands, and the strands were sufficiently integrated in the roving so that post-cure of the size coating after roving was not required, but upon chopping and spraying at the gun, the pieces of roving separated advantageously into pieces of strand, which maintained good integrity.

The unsaturated polyester resin laminates formed with these rovings exhibited excellent tensile strength and modulus, flexural strength and modulus both dry and after immersion in boiling water for 24 hours, impact strength, and other desirable characteristics.

Numerous variations and modifications of the invention as particularly described herein will be apparent to those skilled in the art, and such variations and modifications are intended to be comprehended within the scope of the invention.

We claim:

1. A substantially chrome-free aqueous sizing composition for glass fiber gun roving which comprises (A) a mixture of emulsified film-forming polymers comprising a polymer of vinyl acetate and ethylene, a polymer of vinyl acetate and an epoxy-functional vinyl monomer, and an unsaturated polyester resin; (B) titanium acetyl acetonate; (C) a silylated polyamino-polyamide hydrochloride or hydrolysate thereof; (D) a cationic lubricant; and (E) 3-methacryloxypropyltrimethoxysilane or hydrolysate thereof.

2. An aqueous composition according to claim 1 wherein the proportions by weight of the components relative to the total weight of the aqueous composition, are about:
   (A) 1 to 5% of said emulsified polymer of vinylacetate and ethylene, 1 to 5% of said emulsified epoxy-functional vinyl monomer, and 0.5 to 1.5% of said emulsified polyester resin;
   (B) 0.5 to 1.5% of said titanium acetyl acetonate;
   (C) 0.01 to 0.2% of said silylated polyamide hydrochloride;
   (D) 0.005 to 0.1% of said cationic lubricant; and
   (E) 0.005 to 0.1% of said silane.

3. An aqueous composition according to claim 2 wherein said epoxy-functional vinyl monomer is glycidyl acrylate or methacrylate, said unsaturated polyester resin comprises a minor proportion by weight at an unsaturated plasticizer latently reactive therewith, and said cationic lubricant is a weak acid salt of a partial fatty acid amide of a polyamine.

4. A glass fiber coated with the in situ dried residue of an aqueous composition according to claim 1.

5. A glass fiber coated with the in situ dried residue of an aqueous composition according to claim 2.

6. A glass fiber coated with the in situ dried residue of an aqueous composition according to claim 3.

7. A coated glass fiber according to claim 4 wherein the coating comprises about 0.5 to about 2 percent of the weight of the glass.

8. A glass fiber according to claim 5 wherein the coating comprises about 0.5 to about 2 percent of the weight of the fiber.

9. A glass fiber according to claim 6 wherein the coating comprises about 0.5 to about 2 percent of the weight of the fiber.

10. A glass fiber gun roving comprising a plurality of coated glass fibers according to claim 4.

11. A glass fiber gun roving comprising a plurality of coated glass fibers according to claim 5.

12. A glass fiber gun roving comprising a plurality of coated glass fibers according to claim 6.

13. A glass fiber gun roving according to claim 12 wherein the fibers are about 10 to about 13 μm in diameter.

14. A glass fiber roving according to claim 13 comprising about 30 to about 70 strands weakly integrated with each other, each strand comprising about 100 to about 300 of said coated glass fibers tightly integrated into said strand by the coating on said fibers.

* * * * *